US 10,998,953 B1

(12) United States Patent
Jiang et al.

(10) Patent No.: US 10,998,953 B1
(45) Date of Patent: *May 4, 2021

(54) GROUP ADDRESSING FOR BEAMFORMING TRAINING

(71) Applicant: Marvell Asia Pte, Ltd., Singapore (SG)

(72) Inventors: Jinjing Jiang, San Jose, CA (US); Liwen Chu, San Ramon, CA (US); Lei Wang, San Diego, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,622

(22) Filed: Jan. 29, 2020

Related U.S. Application Data

(63) Continuation of application No. 15/706,519, filed on Sep. 15, 2017, now Pat. No. 10,560,164.

(60) Provisional application No. 62/395,003, filed on Sep. 15, 2016.

(51) Int. Cl.
*H04W 84/02* (2009.01)
*H04L 5/00* (2006.01)
*H04B 7/06* (2006.01)
*H04W 74/06* (2009.01)
*H04L 25/03* (2006.01)

(52) U.S. Cl.
CPC ......... *H04B 7/0617* (2013.01); *H04B 7/0619* (2013.01); *H04L 5/0007* (2013.01); *H04W 74/06* (2013.01); *H04W 84/02* (2013.01); *H04L 2025/03815* (2013.01)

(58) Field of Classification Search
CPC .............................. H04W 74/06; H04W 84/02
USPC ......................................................... 370/346
See application file for complete search history.

(56) References Cited

U.S. PATENT DOCUMENTS

| | | |
|---|---|---|
| 9,166,660 B2 | 10/2015 | Chu et al. |
| 10,560,164 B1 | 2/2020 | Jiang et al. |
| 2010/0103045 A1 | 4/2010 | Liu et al. |
| 2011/0261708 A1 | 10/2011 | Grandhi |
| 2018/0006705 A1 | 1/2018 | Cariou et al. |
| 2018/0013474 A1 | 1/2018 | Cordeiro |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

(Continued)

*Primary Examiner* — Angel T Brockman

(57) ABSTRACT

A first communication device generates a beamforming training initiator packet for transmission in a wireless communication network. The beamforming training initiator packet indicates a start of a beamforming training session, and includes a plurality of fields that respectively and individually identify multiple second communication devices that are to process beamforming training packets transmitted by the first communication device during the beamforming training session. The first communication device transmits the beamforming training initiator packet, and then transmits a plurality of beamforming training packets during the beamforming training session.

21 Claims, 6 Drawing Sheets

(56) References Cited

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Cordeiro, "IEEE P802.11, Wireless LANs, Specification Framework for TGay," IEEE Draft 802.11-15/01358r5, 26 pages (Aug. 16, 2016).

Josiam et al., "Generic Control Frame for 802.11ay," IEEE Draft 802.11-16/0697ro, 12 pages (May 17, 2016).

Wang et al., "11ay DL MU-MIMO FB Training and User Selection," IEEE Draft 802.11-16/0405r1, 17 pages (Mar. 13, 2016).

GROUP ADDRESSING FOR BEAMFORMING TRAINING

CROSS REFERENCES TO RELATED APPLICATIONS

This application is a continuation of U.S. patent application Ser. No. 15/706,519, entitled, "Group Addressing for Beamforming Training," filed on Sep. 15, 2017, which claims the benefit of U.S. Provisional Patent Application No. 62/395,003, entitled "DL MU-MIMO Beamforming Using Generic Control Frame in 11ay," filed on Sep. 15, 2016. Both of the applications referenced above are incorporated herein by reference in their entireties.

FIELD OF TECHNOLOGY

The present disclosure relates generally to wireless communication systems, and more particularly to beamforming training procedures.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard, now under development, promises to provide even greater throughput, such as throughputs in the tens of Gbps range.

The IEEE 802.11a,b,g,n,ac,ax standards utilize 20 MHz channels between about 2 GHz and 6 GHz. The IEEE 802.11n Standard permits two 20 MHz channels to be bonded to form a 40 MHz channel, whereas the IEEE 802.11ac and ax standards allow up to eight 20 MHz channels to be bonded to form up to a 160 MHz channel.

The IEEE 802.11ad Standard utilizes 2.16 GHz channels between about 47 GHz and 70 GHz. The much wider channels in the IEEE 802.11ad Standard as compared to IEEE 802.11ax, for example, potentially provide higher date rates. Because of the higher frequencies in the IEEE 802.11ad Standard as compared to IEEE 802.11ax, for example, wireless signal attenuation is more pronounced, and thus beamforming technology is important for maintaining a suitable range.

The IEEE 802.11ay Standard, now under development, promises to improve upon the IEEE 802.11ad Standard.

SUMMARY

In an embodiment, a method for performing beamforming training in a wireless communication network includes: generating, at a first communication device, a beamforming training initiator packet for transmission in the wireless communication network, the beamforming training initiator packet indicating a start of a beamforming training session, the beamforming training initiator packet generated to include a plurality of fields that respectively and individually identify multiple second communication devices that are to process beamforming training packets transmitted by the first communication device during the beamforming training session; transmitting, by the first communication device, the beamforming training initiator packet; and after transmitting the beamforming training initiator packet, transmitting, by the first communication device, a plurality of beamforming training packets during the beamforming training session.

In another embodiment, a first wireless communication device comprises: a wireless network interface device that includes one or more integrated circuit (IC) devices. The one or more IC devices are configured to: generate a beamforming training initiator packet for transmission in the wireless communication network, the beamforming training initiator packet indicating a start of a beamforming training session, the beamforming training initiator packet generated to include a plurality of fields that respectively and individually identify multiple second wireless communication devices that are to process beamforming training packets transmitted by the first wireless communication device during the beamforming training session; control the wireless network interface device to transmit the beamforming training initiator packet; and after transmitting the beamforming training initiator packet, control the wireless network interface device to transmit a plurality of beamforming training packets during the beamforming training session.

In yet another embodiment, a method for participating in beamforming training in a wireless communication network includes: receiving, at a first communication device, a beamforming training initiator packet that indicates a start of a beamforming training session and that includes a plurality of fields that respectively and individually identify multiple communication devices, among a plurality of communication devices, that are to process beamforming training packets transmitted by a second communication device during the beamforming training session; determining, at the first communication device, whether one of the fields, among the plurality of fields in the beamforming training initiator packet that respectively and individually identify multiple communication devices, indicates that the first communication device is to process beamforming training packets transmitted by the second communication device during the beamforming training session; and in response to determining that one of the fields, among the plurality of fields in the beamforming training initiator packet that respectively and individually identify multiple communication devices, indicates that the first communication device is to process beamforming training packets transmitted by the second communication device during the beamforming training session, participating, by the first communication device in the beamforming training session, including processing beamforming training packets received from the second communication device during the beamforming training session.

In still another embodiment, a first wireless communication device comprises: a wireless network interface device that includes one or more IC devices. The one or more IC devices are configured to: receive a beamforming training initiator packet that indicates a start of a beamforming training session and that includes a plurality of fields that respectively and individually identify multiple wireless communication devices, among a plurality of wireless communication devices, that are to process beamforming training packets transmitted by a second wireless communication device during the beamforming training session; determine whether one of the fields, among the plurality of fields in the beamforming training initiator packet that respectively and individually identify multiple communication devices, indicates that the first wireless communication device is to process beamforming training packets transmitted by the second wireless communication device during the beamforming training session; and in response to determining that one of the fields, among the plurality of fields in the beamforming training initiator packet that respectively and individually identify multiple wireless communication devices, indicates that the first wireless communication device is to process beamforming training packets transmitted by the second wireless communication device during the beamforming training session, control the wireless network interface device to participate in the beamforming training session, including processing beamforming training packets received from the second wireless communication device during the beamforming training session.

DETAILED DESCRIPTION

Group addressing techniques and beamforming training techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, group addressing techniques and beamforming training techniques are utilized in other types of wireless communication systems such as personal area networks (PANs), mobile communication networks such as cellular networks, metropolitan area networks (MANs), etc.

Figure 1:
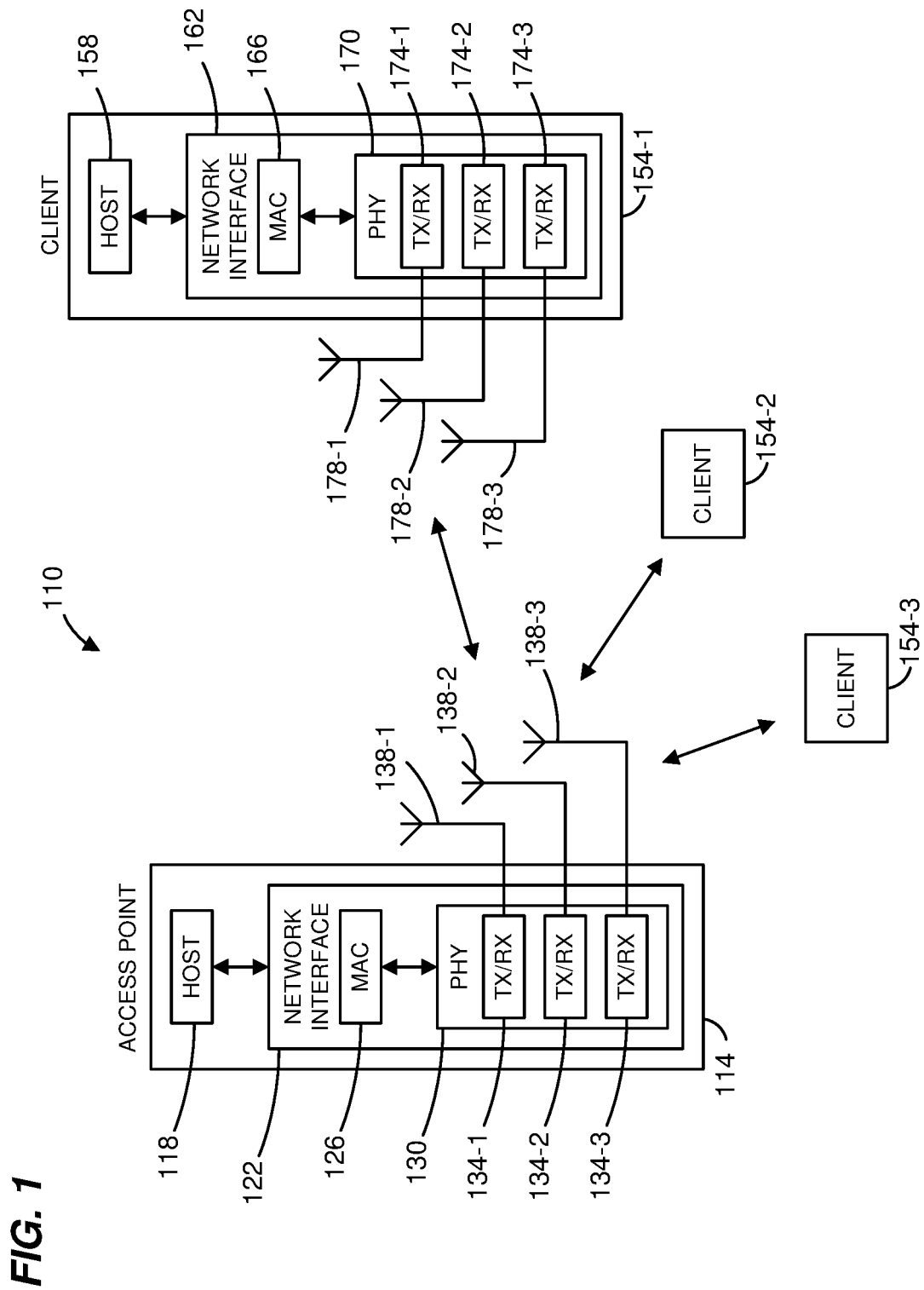
FIG. 1 is a block diagram of an example wireless local area network (WLAN) that implements a beamforming training (BFT) procedure, according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130.

The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 includes circuitry (e.g., in the transceivers 134) configured to upconvert baseband signals to radio frequency (RF) signals for wireless transmission via the antennas 138.

Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. The PHY processor 130 includes circuitry (e.g., in the transceivers 134) configured to downconvert RF signals received via the antennas 138 to baseband signals.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol.

The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 includes circuitry (e.g., in the transceivers 174) configured to upconvert baseband signals to RF signals for wireless transmission via the antennas 178.

Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units. The PHY processor 170 includes circuitry (e.g., in the transceivers 174) configured to downconvert RF signals received via the antennas 178 to baseband signals.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
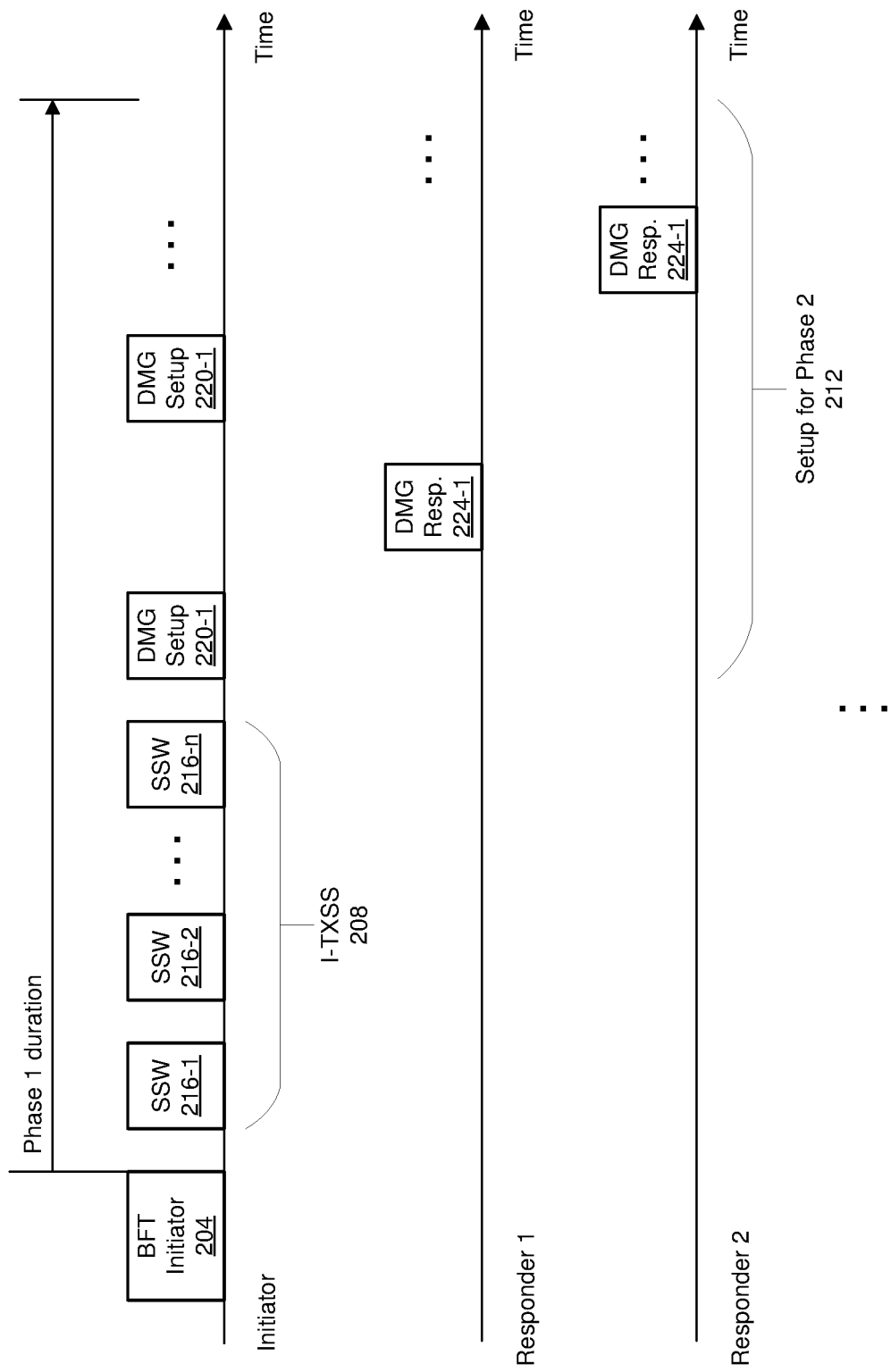
FIG. 2 is a block diagram of an example BFT session of a BFT procedure implemented by a wireless communication network such as the WLAN of FIG. 1, according to an embodiment.

FIG. 2 is a diagram of an example beamforming training (BFT) session 200 between an initiator communication device (initiator) and a plurality of responding communication devices (responders), according to an embodiment. In an embodiment, the initiator is the AP 114 (FIG. 1) and the responders are a subset of the client stations 154 (FIG. 1). In another embodiment, the initiator is one of the client stations 154 (FIG. 1) and the responders are the AP 114 and one or more other client stations 154 (FIG. 1), a group of other client stations 154, etc. In other embodiments, the BFT session 200 is performed in other suitable wireless networks with other suitable communication devices. Merely for ease of explanation and brevity, FIG. 2 is described in the context of the AP 114 (FIG. 1) as the initiator and a subset of the client stations 154 (FIG. 1) as the responders.

The BFT session 200 corresponds to a first phase (phase 1) of a BFT procedure that includes a plurality of phases. For example, phase 1 corresponds to a transmit sector sweep (TXSS) phase that is used to determine, for example, respective initial transmit beamforming vectors to be used by the initiator when transmitting to respective responders. The BFT procedure includes one or second phases (phase 2) that occur after phase 1 and that are not shown in FIG. 2. Phase 2 is used to determine, for example, respective initial receive beamforming vectors to be used by the initiator when receiving transmissions from respective responders, refining initial transmit/receive beamforming vectors, determining transmit/receive beamforming vectors for responders, etc.

In the BFT session 200, the initiator (e.g., the AP 114) transmits a beamforming training (BFT) initiator packet 204 to a set of responders (e.g., a set of client stations 154). As will be described below in more detail, the BFT initiator packet 204 includes a list of individual identifiers of communication devices (i.e., not a single identifier corresponding to a group of multiple communication devices) that are to participate in phase 1 of the BFT procedure, according to an embodiment. Upon processing information in the BFT initiator packet 204, second communication devices determine whether they are to participate in phase 1 of the BFT procedure.

Phase 1 includes an initiator TXSS (I-TXSS) period 208 and a setup period 212 for phase 2 of the BFT procedure. During the I-TXSS period 208, the initiator transmits a plurality of BFT packets 216. In an embodiment, each BFT packet 216 is a beamforming short sector sweep (SSW) training packet. For example, in an embodiment, the initiator transmits one or more BFT packets 216 individually from each of multiple antennas. In an embodiment, each BFT packet 216 includes a respective identifier that distinguishes the BFT packet 216 from other BFT packets 216 within the I-TXSS period 208. Examples of SSW training packets are described in the IEEE 802.11ad Standard and in drafts of the IEEE 802.11ay Standard, now under development. Other suitable types of BFT packets are used in other embodiments.

In an embodiment, the initiator does not transmit any other packets between the end of transmission of the BFT initiator packet 204 and the first (in time) BFT packet 216-1. In an embodiment, the initiator begins transmitting the first (in time) BFT packet 216-1 a suitable time period after the end of transmission of the BFT initiator packet 204.

The responders measure and record information for each received BFT packet 216 such as one or more of a received signal strength indicator (RSSI), a signal to interference plus noise ratio (SINR), etc., and/or other suitable signal measurement information, according to an embodiment. In an embodiment, the responders measure and record channel estimate information (sometimes referred to as channel state information or CSI) for each received BFT packet 216, according to an embodiment. The recorded signal and/or channel information for each received BFT packet 216 is associated at the responders with the identifiers included in the received BFT packets 216.

During the setup period 212, the initiator prompts the responders to feed back to the initiator the recorded signal and/or channel information, in an embodiment. For example, the initiator transmits a plurality of polling packets 220 (sometimes referred to herein as directional multi-gigabit (DMG) setup packets) that respectively prompt the responders to transmit feedback packets 224 (sometimes referred to herein as DMG setup response packets). Using the recorded signal and/or channel information associated with respective BFT packets 216, the initiator (first communication device) selects initial transmit vectors to use in phase 2 of the BFT procedure.

Figure 3:
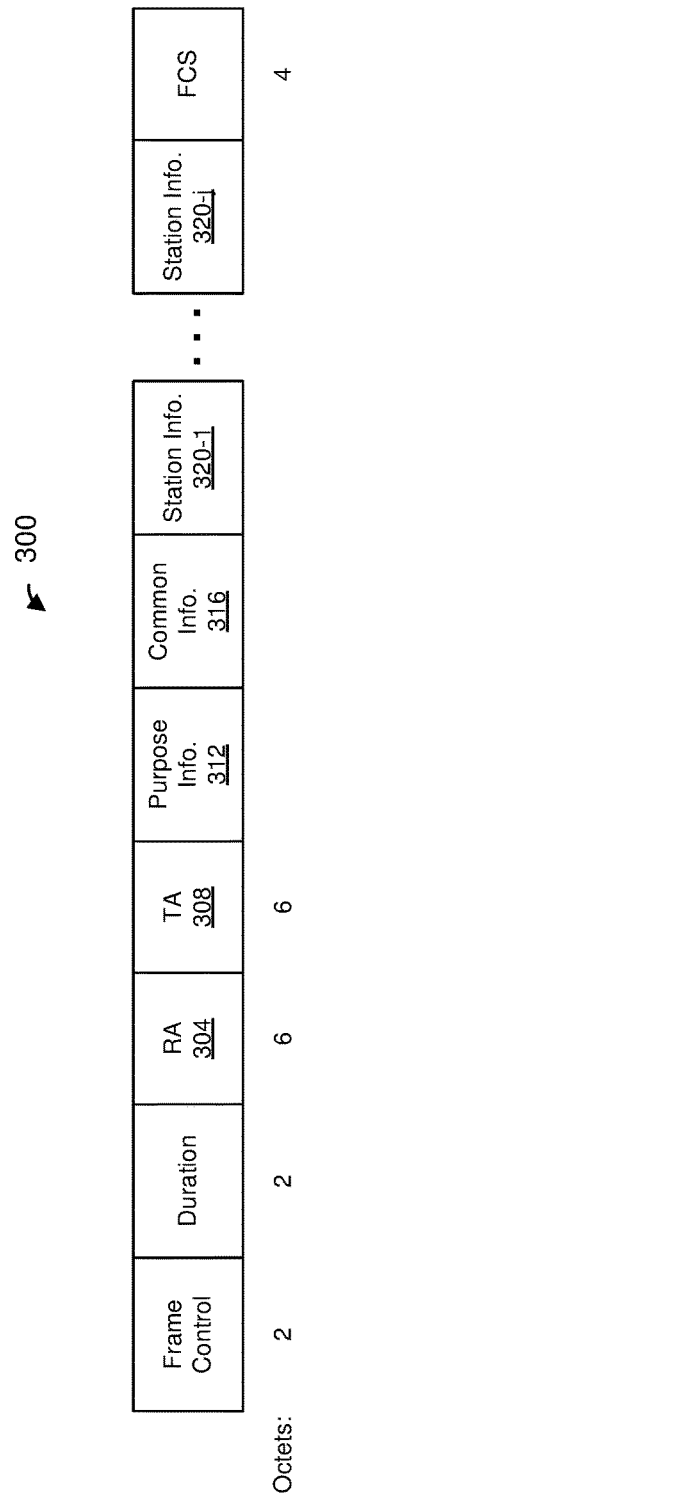
FIG. 3 is a block diagram of an example generic control frame used in a wireless communication network such as the WLAN of FIG. 1, according to an embodiment.

In some embodiments, the BFT initiator packet 204 includes a generic control frame defined by a communication protocol. As used herein, the term "frame" refers to a MAC protocol data unit. FIG. 3 is a diagram of an example generic control frame 300. In some embodiments, the MAC processor 126 and/or the MAC processor 166 are configured to generate the generic control frame 300. The MAC processor 126/166 then provides the generic control frame 300 to the PHY processor 130/170, which then generates a PHY data unit (which includes the control frame 300) for wireless transmission. In other embodiments, another suitable communication device generates the generic control frame 300.

FIG. 3 includes example numbers of octets of various fields of the generic control frame 300. In other embodiments, different suitable numbers of octets and bits are utilized. Fields in FIG. 3 that do not have an associated number of octets/bits are of a suitable length and/or a variable length. In other embodiments, one or more of the fields illustrated in FIG. 3 are omitted, and/or one or more additional fields are included.

The generic control frame 300 includes a receiver address (RA) field 304 to indicate an intended receiver of the generic control frame 300. The RA field 304 can be set to a unicast address (e.g., a unicast MAC address) to specify a single communication device, a multicast address (e.g., a multicast MAC address) to specify a particular group of communication devices, or a broadcast address (e.g., a broadcast MAC address) to specify all communication devices, in some embodiments. The generic control frame 300 also includes a transmitter address (TA) field 308 to indicate the transmitter of the generic control frame 300. The TA field 304 can be set to a unicast address (e.g., unicast MAC address) corresponding to the network interface 122 or the network interface 162, for example.

The generic control frame 300 also includes a purpose information field 312. The generic control frame 300 can be utilized for various control frame purposes by setting the purpose information field 312, or a subfield within the purpose information field 312, to different values corresponding to the different control frame purposes or types. For example, a receiver device will interpret a format of, and/or content of, at least some fields in the generic control frame 300 differently for different values of the purpose information field 312, or for different values of a subfield within the purpose information field 312, according to some embodiments.

The generic control frame 300 further includes a common information field 316 and one or more station information fields 320. The formats and/or content of the common information field 316 and one or more station information fields 320 may vary depending on the value of the purpose information field 312 or a subfield within the purpose information field 312, according to an embodiment. For example, a receiver device will interpret a format of, and/or content of, the common information field 316 and/or the station information fields 320 differently for different values of the purpose information field 312, or for different values of a subfield within the purpose information field 312, according to some embodiments. In some embodiments, the common information field 316 is omitted entirely or omitted for some values of the purpose information field 312.

By setting the purpose information field 312, or a subfield within the purpose information field 312, to an appropriate value, the generic control frame 300 can be used for different control purposes such as channel bonding negotiation, orthogonal frequency division multiple access (OFDMA) set up, multiple input, multiple output (MIMO) communication set up, etc.

Figure 4:
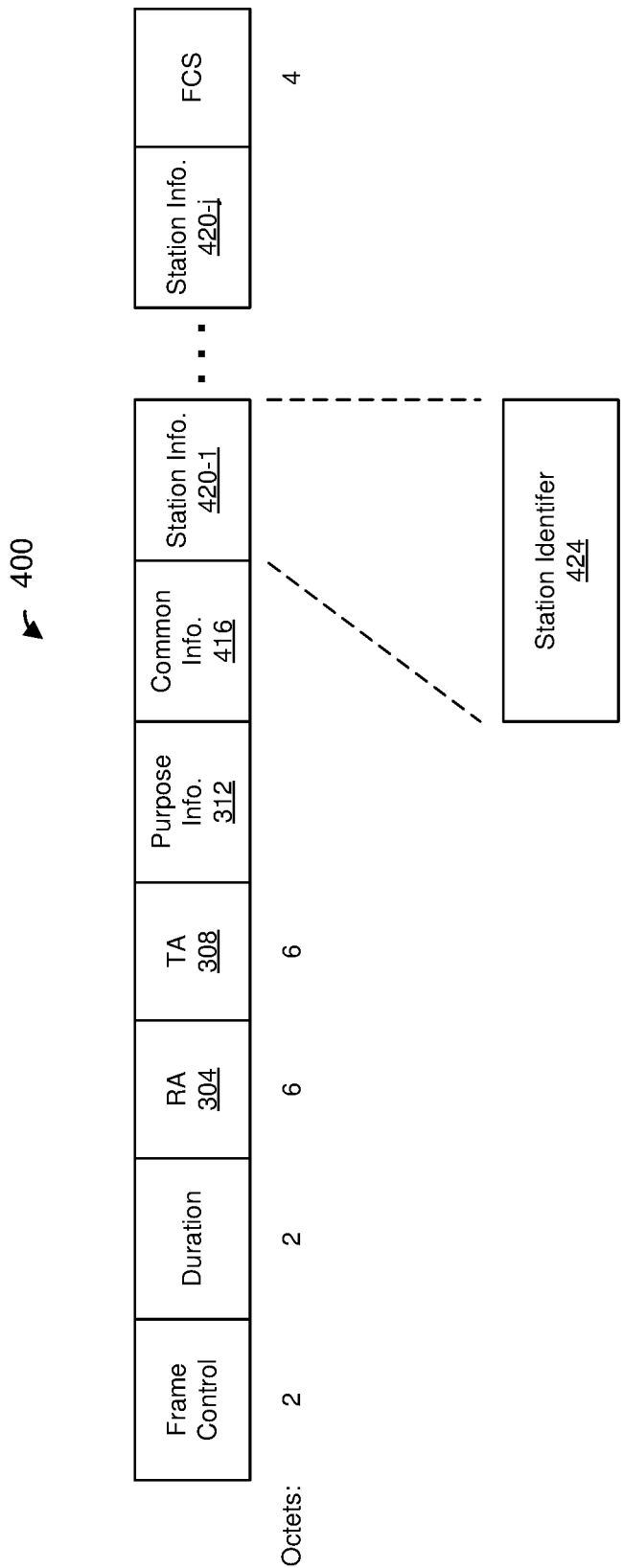
FIG. 4 is a block diagram of an example BFT initiator frame implemented using a generic control frame, according to an embodiment.

FIG. 4 is a diagram of an example generic control frame 400 when the purpose information field 312 or a subfield within the purpose information field 312, is set to a value to indicate that the generic control frame 400 corresponds to a BFT initiator packet (e.g., such as the BFT initiator packet 204) for initiating a BFT session such as the BFT session 200 or another suitable BFT session.

In some embodiments, the MAC processor 126 and/or the MAC processor 166 are configured to generate the generic control frame 400. The MAC processor 126/166 then provides the generic control frame 400 to the PHY processor 130/170, which then generates a PHY data unit (which includes the control frame 400) for wireless transmission. In other embodiments, another suitable communication device generates the generic control frame 400.

In an embodiment, the RA field 304 does not include a group address identifying a specific set of multiple communication devices for which the generic control frame 400 is intended. Rather, the RA field 304 is set to a broadcast address that does not identify a specific group of communication devices, in an embodiment. In another embodiment, the RA field 304 is set to a unicast address of the transmitter device. In another embodiment, the RA field 304 is set to some predefined value that does not correspond to a group address identifying the specific set of multiple communication devices for which the generic control frame 400 is intended.

In an embodiment, the purpose information field 312 or a subfield within the purpose information field 312, can be set to different values to distinguish between initiation of a BFT session associated with phase 1 of a BFT procedure, or a BFT session associated with phase 2 of the BFT procedure.

In some embodiments, a common information field 416, corresponding to the value of the purpose information field 312 or a subfield within the purpose information field 312, includes one or more fields including one or more parameters associated with the BFT session including one or more of a field indicating a duration of a period in which BFT packets are transmitted (e.g., the I-TXSS period 208), a field indicating a duration of a setup period in which BFT feedback packets are transmitted (e.g., the setup period 212), one or more fields indicating which transmit antennas will be used during transmission of BFT packets during the BFT session, one or more fields indicating which transmit sectors will be used during transmission of BFT packets during the BFT session, a field indicating a number of receive training fields that will be used during the BFT session, a field indicating whether simultaneous transmit antenna training will be performed during the BFT session, etc., and/or other suitable parameters.

In some embodiments, the common information field 416 is omitted from the generic control frame 400. For example, information in the common information field 416 such as described above is instead included in each of the station information fields 420 or in another field (not shown) of the generic control frame 400.

In some embodiments, each station information field 420 includes a corresponding station identifier field 424. The station identifier field 424 is populated with an identifier of a communication device that is to participate in the BFT session. The identifier is a unicast MAC address, an association identifier (AID) assigned to an individual client station by an access point, a partial AID (e.g., only a subset of bits of the AID assigned to the individual client station), an AID (or partial AID) assigned to a group of client stations (e.g., a multicast group) by the access point, a broadcast AID (or partial AID), etc. In an embodiment, when the station identifier field 424 is populated with an AID for a broadcast or multicast group, generic control frame 400 includes only one station information field 420. In some embodiments, when the AP intends to perform a BFT session with a group of client stations for which a multicast AID has already been setup, or intends to perform the BFT session with all client stations, for example, the AP generates the generic control frame 400 to include only one station information field 420, and sets the station identifier field 424 to an AID (or partial AID) for a broadcast or multicast group.

Thus, the initiator populates the station identifier fields 424 of the station information fields 420 with identifiers of individual responders that are to participate in the BFT session. A receiving device analyzes the purpose information field 312 to determine that the generic control frame 300 corresponds to initiation of a BFT session. The receiving device also analyzes the station identifier fields 424 in the station information fields 420 to determine whether any of the identifier fields 424 include an identifier corresponding to the receiving device. If the receiving device determines that one of the station identifier fields 424 includes an identifier corresponding to the receiving device, the receiving device determines that the receiving device is to participate in the imminent BFT session. In embodiments that include the common information field 416, the receiving device also analyzes the common information field 416 to obtain parameters corresponding to the imminent BFT session.

In an embodiment, the control frame 400 does not include a group address corresponding to a set of multiple communication devices that are to participate in the BFT session, and such a group address is not needed by a communication device to determine whether the communication device should process BFT packets transmitted during the BFT session. For example, the RA field 304 does not include a group address corresponding to a set of multiple communication devices that are to participate in the BFT session. The use of group addresses incurs processing and communications overhead. For example, an access point must manage membership in groups and communication group membership information to client stations in a network. In many scenarios, a wireless communication network may include large numbers of communication devices, and an access point, for example, may choose to perform many BFT sessions with different combinations of communication devices. Thus, establishing and managing group addresses for different groups in a large network for the purpose of BFT training will incur a processing and communications overhead. However, using a BFT initiator packet 204 and/or a control frame 400 such as described above to initiate a BFT session does not require the use of group addresses and thus reduces processing and communications overhead associated with the use of group addresses, at least in some embodiments and/or scenarios.

Figure 5:
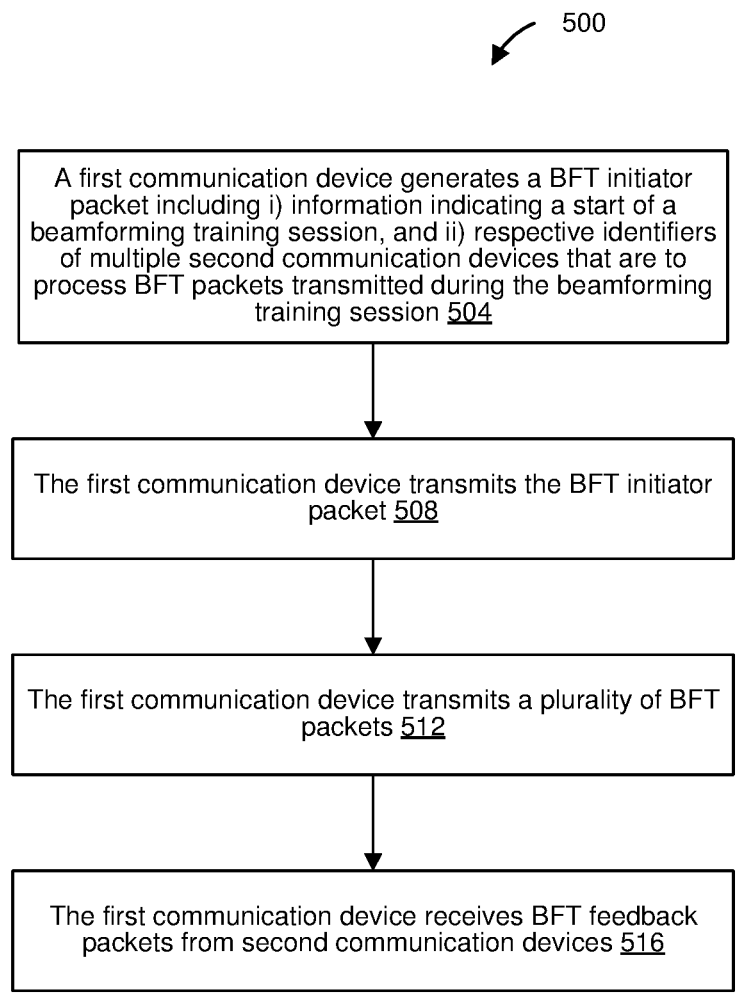
FIG. 5 is a flow diagram of an example method for performing beamforming training in a wireless communication network such as the WLAN of FIG. 1, according to an embodiment.

FIG. 5 is a flow diagram of an example method 500 for performing beamforming training in a wireless communication network, according to an embodiment. The method 500 involves communications between a first communication device and multiple second communication devices. The method 500 is described in the context of the WLAN 100 of FIG. 1 merely for explanatory purposes. For example, in an embodiment, the first communication device in the method 500 corresponds to the AP 114 and second communication devices in the method 500 correspond to client stations 154. In an embodiment, the method 500 is implemented by the network interface device 122 of the AP 114, and FIG. 5 is described below in that context merely for explanatory purposes. In another embodiment, the method 500 is implemented by the network interface device 162 of the client station 154-1. In other embodiments, the method 500 is implemented in another suitable wireless communication network with other suitable communication devices.

At block 504, the first communication device (e.g., the network interface device 122 of the AP 114) generates a BFT initiator packet that includes i) information indicating a start of a BFT session, and ii) respective identifiers of multiple second communication devices (e.g., client stations 154) that are to process BFT packets transmitted during the BFT session. In an embodiment, the BFT initiator packet does not include a group address corresponding to the multiple second communication devices.

In an embodiment, block 504 includes generating a generic control frame (defined by a communication protocol) that includes a first field (e.g., the purpose field 312) that includes information indicating a start of a BFT session, and multiple second fields (e.g., station information fields 420) that respectively include the identifiers of the multiple second communication devices.

In some embodiments, when the first communication device intends to perform a BFT session with a group of client stations for which a multicast AID has already been setup, or intends to perform the BFT session with all client stations, for example, block 504 includes generating the generic control frame 400 to include only one station information field 420, where the station identifier field 424 is set to an AID (or a partial AID) for a broadcast or multicast group.

In some embodiments, the communication protocol defines a BFT procedure that includes a plurality of phases, and information in the purpose field also indicates the BFT session corresponds to one of the phases in the plurality of phases.

In an embodiment, the generic control frame also includes a common information field that includes one or more parameters for the BFT session.

In an embodiment, block 504 includes generating a MAC data unit (e.g., the generic control frame 400) and providing the MAC data unit to a PHY processor (e.g., the PHY processor 130), and the PHY processor generating a PHY data unit that includes the MAC data unit.

At block 508, the first communication device (e.g., the network interface 126) transmits the BFT initiator packet. In an embodiment, block 508 includes a PHY processor (e.g., the PHY processor 130) upconverting a PHY data unit to one or more RF signals, and providing the one or more RF signals to one or more antennas (e.g., the antennas 138).

At block 512, the first communication device (e.g., the network interface 126) transmits a plurality of BFT packets as part of the BFT session. In an embodiment, the BFT packets transmitted at block 512 do not include a group address corresponding to the multiple second communication devices. Rather, second communication devices determine whether they are to process the BFT packets based on the BFT initiator packet transmitted at block 508.

In an embodiment, block 512 includes a PHY processor (e.g., the PHY processor 130) upconverting PHY data units to one or more RF signals, and providing the one or more RF signals to one or more antennas (e.g., the antennas 138).

At block 516, the first communication device (e.g., the network interface 126) receives BFT feedback packets from at least some second communication devices (e.g., client stations 154) corresponding to the identifiers of the multiple second communication devices in the BFT initiator packet transmitted at block 508. The first communication device (e.g., the network interface 126) may use information in the BFT feedback packets as discussed above, for example.

Figure 6:
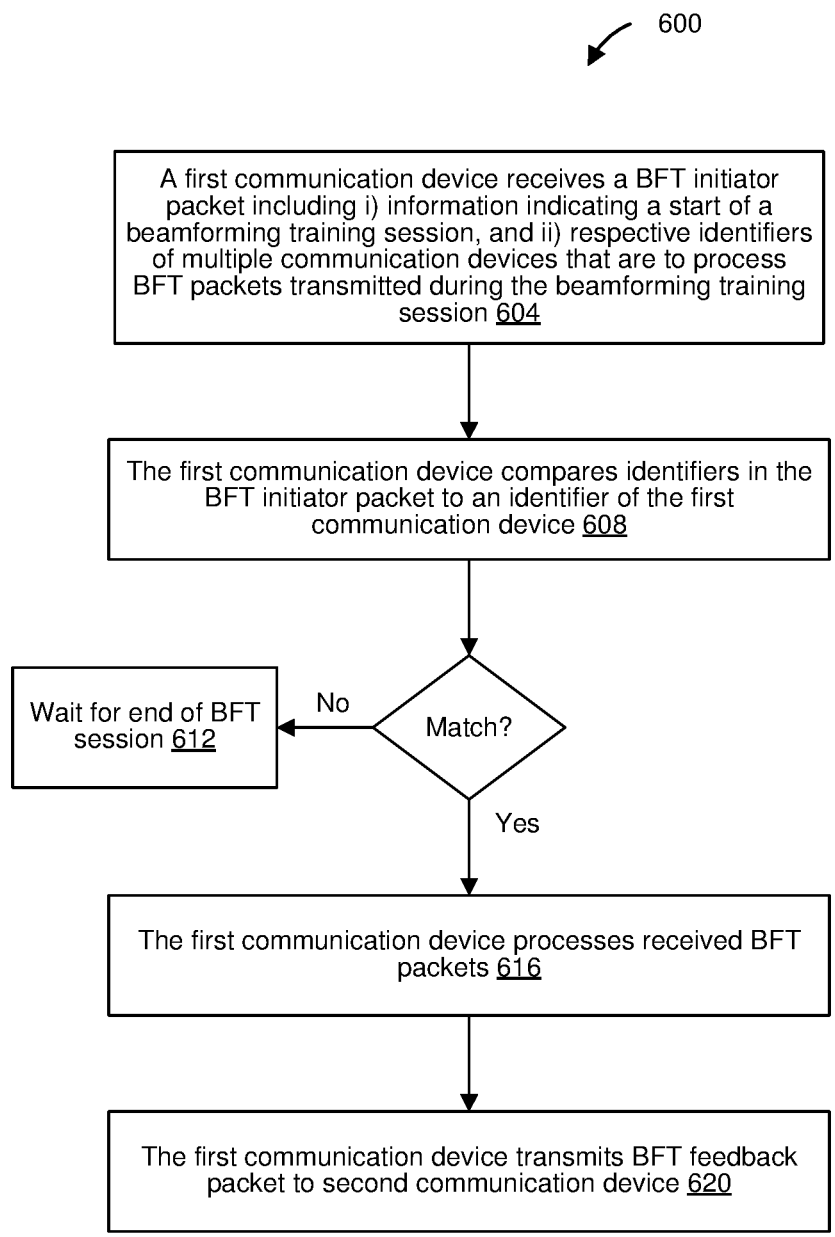
FIG. 6 is a flow diagram of another example method for performing beamforming training in a wireless communication network such as the WLAN of FIG. 1, according to an embodiment.

FIG. 6 is a flow diagram of an example method 600 for performing beamforming training in a wireless communication network, according to an embodiment. The method 600 involves communications between a first communication device and a second communication device. The method 600 is described in the context of the WLAN 100 of FIG. 1 merely for explanatory purposes. For example, in an embodiment, the first communication device in the method 600 corresponds to the client station 154-1 and the second communication device in the method 600 correspond to the AP 114. In an embodiment, the method 600 is implemented by the network interface device 162 of the client station 154-1, and FIG. 6 is described below in that context merely for explanatory purposes. In another embodiment, the method 600 is implemented by the network interface device 122 of the AP 114. In other embodiments, the method 600 is implemented in another suitable wireless communication network with other suitable communication devices.

At block 604, the first communication device (e.g., the network interface device 162 of the client station 154-1) receives a BFT initiator packet that includes i) information indicating a start of a BFT session, and ii) respective identifiers of multiple communication devices (e.g., client stations 154) that are to process BFT packets transmitted during the BFT session. In an embodiment, the BFT initiator packet does not include a group address corresponding to the multiple second communication devices.

In an embodiment, BFT initiator packet received at block 604 includes a generic control frame (defined by a communication protocol) that includes a first field (e.g., the purpose field 312) that includes information indicating a start of a BFT session, and multiple second fields (e.g., station information fields 420) that respectively include the identifiers of the multiple second communication devices.

In some embodiments, the communication protocol defines a BFT procedure that includes a plurality of phases, and information in the purpose field also indicates the BFT session corresponds to one of the phases in the plurality of phases.

In an embodiment, the generic control frame also includes a common information field that includes one or more parameters for the BFT session.

In an embodiment, block 604 includes the PHY processor 170 downconverting one or more RF signals, received via one or more antennas 178, corresponding to a PHY data unit that includes a MAC data unit (e.g., the generic control frame 400) from the second communication device, extracting the MAC data unit from the PHY data unit, and providing the MAC data unit to the MAC processor 166.

At block 608, the first communication device (e.g., the MAC processor 166 of the client station 154-1) compares an identifier of the first communication device (e.g., a unicast MAC address corresponding to the network interface device 162, an AID assigned by an AP to the client station 154-1, a partial AID, etc.) to identifiers included in the BFT initiator packet received at block 604.

In some embodiments that utilize the generic control frame 400, the generic control frame 400 received at block 604 includes only one station information field 420, where the station identifier field 424 is set to an AID (or a partial AID) for a broadcast or multicast group, and block 608 includes the first communication device (e.g., the MAC processor 166 of the client station 154-1) comparing the AID (or partial AID) in the station identifier field 424 to a broadcast AID (or partial AID), and/or to any multicast AIDs (or partial AIDs) to which the first communication device belongs.

If the first communication device (e.g., the MAC processor 166 of the client station 154-1) determines that the identifier of the first communication device does not match any of the identifiers included in the BFT initiator packet received at block 604, the flow proceeds to block 612. At block 612, the first communication device waits until the BFT session is completed. For example, in an embodiment, the first communication device sets a network allocation vector (NAV) timer based on duration information included in the BFT initiator packet (received at bloc 604). In an embodiment, waiting for the BFT session to complete includes not processing any of the BFT packets received during the BFT session. In an embodiment, waiting for the BFT session to complete includes going into a power save state during the BFT session.

On the other hand, if the first communication device (e.g., the MAC processor 166 of the client station 154-1) determines that the identifier of the first communication matches one of the identifiers included in the BFT initiator packet received at block 604, the flow proceeds to block 616. At block 616, the first communication device (e.g., the network interface device 162 of the client station 154-1) processes BFT packets received by the first communication device during the BFT session. In an embodiment, block 616 includes measuring and recording information for each received BFT packet such as one or more of an RSSI, an SINR, etc., and/or other suitable signal measurement information. In an embodiment, block 616 includes measuring and recording channel estimate information for each received BFT packet. In an embodiment, block 616 includes associating recorded signal and/or channel information for each received BFT packet with identifiers included in the received BFT packet.

At block 620, the first communication device (e.g., the network interface device 162 of the client station 154-1) transmits one or more BFT feedback packets to the second communication device as part of the BFT session. In an embodiment, transmitting the BFT feedback packet occurs during a setup period for a second stage of the BFT procedure, such as the setup period 212 (FIG. 2). In an embodiment, transmitting the BFT feedback packet is responsive to a prompt from the second communication device. For example, the first communication device receives a polling packet (e.g., a DMG setup packet) from the second communication device that requests the first communication device to transmit a feedback packet, and the first communication device transmits the BFT feedback packet responsive to the polling packet.

In an embodiment, block 620 includes a MAC processor (e.g., the MAC processor 166) generating a MAC data unit and providing the MAC data unit to a PHY processor (e.g., the PHY processor 170), and the PHY processor generating a PHY data unit that includes the MAC data unit, in an embodiment. Additionally, block 620 includes the PHY processor (e.g., the PHY processor 170) upconverting the PHY data unit to one or more RF signals, and providing the one or more RF signals to one or more antennas (e.g., the antennas 178), in an embodiment.

In some embodiments in which the generic control frame 400 received at block 604 includes only one station information field 420, the flow proceeds from block 608 to block 616 when the first communication device determines that an AID (or partial AID) in the station identifier field 424 is set to an AID (or a partial AID) for a broadcast or to an AID (or a partial AID) for a multicast group to which the first communication device belongs. In some embodiments in which the generic control frame 400 received at block 604 includes only one station information field 420, the flow proceeds from block 608 to block 612 when the first communication device determines that an AID (or partial AID) in the station identifier field 424 is not set to an AID (or a partial AID) for a broadcast, and is not set to an AID (or a partial AID) for a multicast group to which the first communication device belongs.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing beamforming training in a wireless communication network, the method comprising:
generating, at a first communication device, a beamforming training initiator packet for transmission in the wireless communication network, the beamforming training initiator packet indicating a start of a beamforming training session, the beamforming training initiator packet generated to include a plurality of fields that respectively and individually identify multiple second communication devices that are to process beamforming training packets transmitted by the first communication device during the beamforming training session;
transmitting, by the first communication device, the beamforming training initiator packet; and
after transmitting the beamforming training initiator packet, transmitting, by the first communication device, a plurality of beamforming training packets during the beamforming training session.

2. The method of claim 1, wherein:
the plurality of beamforming training packets, when transmitted, do not include a group address corresponding to the multiple second communication devices.

3. The method of claim 1, wherein generating the beamforming training initiator packet to include the plurality of fields that respectively and individually identify multiple second communication devices comprises generating the plurality of fields to respectively include respective individual identifiers of the multiple second communication devices.

4. The method of claim 1, wherein generating the beamforming training initiator packet further comprises generating the beamforming training initiator packet to include one or more parameters for the beamforming training session.

5. A first wireless communication device, comprising:
a wireless network interface device that includes one or more integrated circuit (IC) devices configured to:
generate a beamforming training initiator packet for transmission in the wireless communication network, the beamforming training initiator packet indicating a start of a beamforming training session, the beamforming training initiator packet generated to include a plurality of fields that respectively and individually identify multiple second wireless communication devices that are to process beamforming training packets transmitted by the first wireless communication device during the beamforming training session,
control the wireless network interface device to transmit the beamforming training initiator packet, and
after transmitting the beamforming training initiator packet, control the wireless network interface device to transmit a plurality of beamforming training packets during the beamforming training session.

6. The first wireless communication device of claim 5, wherein the one or more IC devices are configured to:
control the wireless network interface device to transmit the plurality of beamforming training packets so that the plurality of beamforming training packets, when transmitted, do not include a group address corresponding to the multiple second wireless communication devices.

7. The first wireless communication device of claim 5, wherein the one or more IC devices are configured to generate the plurality of fields to respectively include respective individual identifiers of the multiple second wireless communication devices.

8. The first wireless communication device of claim 5, wherein the one or more IC devices are configured to generate the beamforming training initiator packet to include one or more parameters for the beamforming training session.

9. The first wireless communication device of claim 5, wherein the wireless network interface device comprises one or more wireless transceivers implemented on the one or more IC devices.

10. The first wireless communication device of claim 5, further comprising:
one or more antennas coupled to the one or more wireless transceivers.

11. A method for participating in beamforming training in a wireless communication network, the method comprising:
receiving, at a first communication device, a beamforming training initiator packet that indicates a start of a beamforming training session and that includes a plurality of fields that respectively and individually identify multiple communication devices, among a plurality of communication devices, that are to process beamforming training packets transmitted by a second communication device during the beamforming training session;
determining, at the first communication device, whether one of the fields, among the plurality of fields in the beamforming training initiator packet that respectively and individually identify multiple communication devices, indicates that the first communication device is to process beamforming training packets transmitted by the second communication device during the beamforming training session; and
in response to determining that one of the fields, among the plurality of fields in the beamforming training initiator packet that respectively and individually identify multiple communication devices, indicates that the first communication device is to process beamforming training packets transmitted by the second communication device during the beamforming training session,
participating, by the first communication device in the beamforming training session, including processing beamforming training packets received from the second communication device during the beamforming training session.

12. The method of claim 11, wherein:
the plurality of beamforming training packets received from the second communication device during the beamforming training session do not include a group address corresponding to the multiple communication devices.

13. The method of claim 11, wherein the plurality of fields that respectively and individually identify multiple communication devices comprises a plurality of fields that respectively include respective individual identifiers of the multiple communication devices.

14. The method of claim 13, wherein:
determining whether one of the fields indicates that the first communication device is to process beamforming training packets transmitted by the second communication device during the beamforming training session comprises:
comparing, at the first communication device, individual identifiers of the multiple communication devices respectively included in the plurality of fields with an individual identifier of the first communication device; and
participating in the beamforming training session is performed in response to determining, at the first communication device, that the individual identifier of the first communication device matches one of the individual identifiers respectively included in the plurality of fields.

15. The method of claim 11, wherein:
the beamforming training initiator packet further includes one or more parameters for the beamforming training session; and
participating in the beamforming training session comprises using the one or more parameters for the beamforming training session.

16. A first wireless communication device, comprising:
a wireless network interface device that includes one or more integrated circuit (IC) devices configured to:
receive a beamforming training initiator packet that indicates a start of a beamforming training session and that includes a plurality of fields that respectively and individually identify multiple wireless communication devices, among a plurality of wireless communication devices, that are to process beamforming training packets transmitted by a second wireless communication device during the beamforming training session,
determine whether one of the fields, among the plurality of fields in the beamforming training initiator packet that respectively and individually identify multiple communication devices, indicates that the first wireless communication device is to process beamforming training packets transmitted by the second wireless communication device during the beamforming training session, and
in response to determining that one of the fields, among the plurality of fields in the beamforming training initiator packet that respectively and individually identify multiple wireless communication devices, indicates that the first wireless communication device is to process beamforming training packets transmitted by the second wireless communication device during the beamforming training session,
control the wireless network interface device to participate in the beamforming training session, including processing beamforming training packets received from the second wireless communication device during the beamforming training session.

17. The first wireless communication device of claim 16, wherein the one or more IC devices are configured to:
process beamforming training packets received from the second communication device during the beamforming training session that do not include a group address corresponding to the multiple communication devices.

18. The first wireless communication device of claim 16, wherein the plurality of fields that respectively and individually identify multiple communication devices comprises a plurality of fields that respectively include respective individual identifiers of the multiple communication devices.

19. The first wireless communication device of claim 18, wherein:
determining whether one of the fields indicates that the first communication device is to process beamforming training packets transmitted by the second communication device during the beamforming training session comprises:
comparing, at the first communication device, individual identifiers of the multiple communication devices respectively included in the plurality of fields with an individual identifier of the first communication device; and
participating in the beamforming training session is performed in response to determining, at the first communication device, that the individual identifier of the first communication device matches one of the individual identifiers respectively included in the plurality of fields.

20. The first wireless communication device of claim 16, wherein the wireless network interface device comprises one or more wireless transceivers implemented on the one or more IC devices.

21. The first wireless communication device of claim 20, further comprising:
one or more antennas coupled to the one or more wireless transceivers.

* * * * *